Nov. 20, 1923.                                               1,475,094
J. C. TUTTLE
SOLID TIRE
Filed Dec. 21, 1920
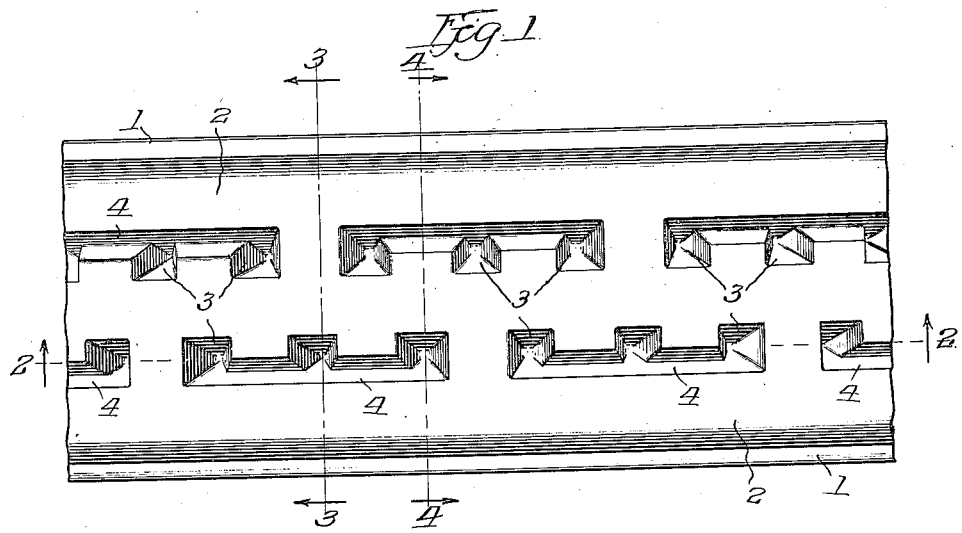
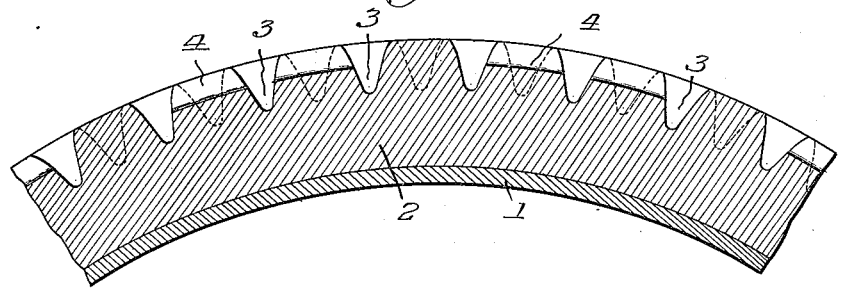
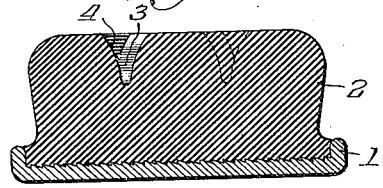
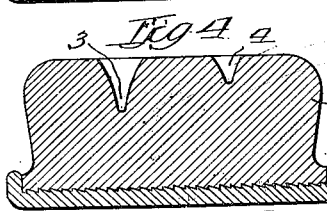
Witness:
Inventor
John C. Tuttle
By
Atty.

Patented Nov. 20, 1923.

1,475,094

UNITED STATES PATENT OFFICE.

JOHN C. TUTTLE, OF AKRON, OHIO, ASSIGNOR TO THE FIRESTONE TIRE AND RUBBER COMPANY, OF AKRON, OHIO, A CORPORATION OF OHIO.

SOLID TIRE.

Application filed December 21, 1920. Serial No. 432,287.

*To all whom it may concern:*

Be it known that I, JOHN C. TUTTLE, a citizen of the United States, residing at Akron, in the county of Summit and State of Ohio, have invented certain new and useful Improvements in Solid Tires, of which the following is a specification.

This invention relates to improvements in resilient tires, particularly solid rubber tires, such as used on trucks or commercial vehicles, and is designed to provide an efficient and effective gripping surface, which will effectually cling to the surface of the road or pavement and prevent skidding and increase traction. It is the purpose of this invention to improve upon certain features of construction and eliminate objectionable features which are present in certain tires designed for this purpose. One of the principal objects of this invention is to afford a tire tread which will grip the road surface, but which will vent itself properly so that noise incident to the use of a suction tire will be eliminated.

These and other advantages arise from a tire of the design herein illustrated, and while the showing and description are detailed, it is not to be understood that the invention is limited to such details, as changes may be made without departing from the principle of the invention and without sacrificing any of its benefits.

In the drawing:

Fig. 1 is a plan view looking down upon the tread of the tire.

Fig. 2 is a longitudinal section on the line 2—2 of Fig. 1.

Fig. 3 is a transverse section on the line 3—3 of Fig. 1.

Fig. 4 is a section on the line 4—4 of Fig. 1.

The tire is carried upon a rim 1 of any desired design and to the outer surface of the rim is secured, preferably by vulcanization the solid tire designated by the numeral 2.

In the tread surface of the tire is arranged a plurality of suction cups or sockets 3, which are arranged about the tread of the tire preferably in parallel rows the cups in different rows being arranged in staggered relation. These suction cups extend into the tire and are shown as pyramidical in shape, tapering inwardly toward the center of the tire. The shape and degree of taper may be varied without affecting the principles of the invention, it being the purpose to make the cups of such depth that sufficient suction will be obtained in rolling over the road surface to prevent slipping or skidding. The staggered position of the cups insures that there will always be one or more cups in contact with the road.

Tread surfaces provided with suction cups are old in the art, but the noise occasioned by the running of the tire over a smooth pavement, due to the release of the vacuum at each cup, has proven objectionable and it is the object of this invention to eliminate the noise without materially affecting the suction.

For this purpose any suitable number of cups are connected by longitudinal grooves or passageways 4 which are approximately half the depth of the cups. It is preferred that the grooves be arranged as shown in the drawing, that is connecting every three cups, and with the grooves in staggered relation. By this arrangement the several cups are released from contact with the road and are vented at the proper time so that the popping due to the sudden release of the vacuum is not present. The sides of the connecting grooves also serve to prevent side-skidding of the tire.

While two parallel circumferential rows of cups or pockets are shown, the invention is not limited to that number, and the length and depth, or location, of the connecting grooves may be varied, if found desirable. Other changes and modifications may be made within the scope of the invention without avoiding the essential features thereof.

I claim:

1. In a resilient tire construction, a plurality of suction cups arranged circumferentially of the tire, and a circumferential groove in the tread of the tire communicating with certain of the cups throughout a portion of the area of each cup and adapted to relieve the vacuum therein.

2. In a resilient tire construction, a series of suction cups arranged in parallel rows about the tread of said tire, and grooves extending circumferentially of said tire and connecting groups of said cups, the grooves in different rows being arranged in staggered relation.

3. In a resilient tire construction, a series of suction cups arranged in parallel rows about the tread of said tire, the cups of different rows being arranged in staggered relation and short grooves connecting a plurality of cups circumferentially of the tire, these grooves being of less depth than the cups.

4. In a resilient tire construction, a series of suction cups arranged in parallel rows about the tread of said tire, the cups of different rows being arranged in staggered relation, and short grooves connecting a plurality of cups circumferentially of the tire, these grooves being of less depth than the cups and arranged so as to break joint transversely of the tire.

5. In a resilient tire construction, a plurality of suction cups, arranged in rows about the tire, and grooves connecting certain of said cups, said grooves being of less depth than the cups and arranged at the sides of the cups.

6. In a resilient tire construction, a plurality of suction cups extending inwardly from the tread of the tire and a groove arranged circumferentially of the tire and connecting certain of said cups, said groove being of less width and depth than the cups.

7. In a resilient tire construction, a plurality of suction cups extending inwardly from the tread of the tire, and a groove arranged circumferentially of the tire, connecting certain of said cups, said groove being of less depth than the cups, and communicating with said cups at the sides thereof.

JOHN C. TUTTLE.